United States Patent [19]

Joó et al.

[11] Patent Number: 4,611,396

[45] Date of Patent: Sep. 16, 1986

[54] FUEL CELL PLATE SEPARATOR

[75] Inventors: Louis A. Joó, Johnson City; Kenneth W. Tucker, Elizabethton; Jay R. Shaner, Johnson City, all of Tenn.

[73] Assignee: Great Lakes Carbon Corporation, Briarcliff Manor, N.Y.

[21] Appl. No.: 723,419

[22] Filed: Apr. 15, 1985

[51] Int. Cl.⁴ ............................................. H01M 6/00
[52] U.S. Cl. ................................. 29/623.5; 29/623.1; 427/115
[58] Field of Search ........................... 29/623.5, 623.1; 427/115, 121; 429/35, 40

[56] References Cited

U.S. PATENT DOCUMENTS 4,115,528  9/1978  Christner et al. ............... 429/45 X
4,365,008  12/1982  De Casperis et al. ............ 429/36

Primary Examiner—Charles F. LeFevour
Attorney, Agent, or Firm—Adrian J. Good

[57] ABSTRACT

A porous graphite electrode for a fuel cell is formed by impregnation of a cellulosic filter paper by coating or impregnating with a low coke yield impregnant on the active center area and with a high coke yield impregnant on the edges, followed by curing, baking, and graphitizing the electrode to form a monolithic porous graphite electrode base with a dense low porosity area at the edges with a less dense higher porosity center working area.

15 Claims, No Drawings

FUEL CELL PLATE SEPARATOR

BACKGROUND OF THE INVENTION

A fuel cell is defined as a primary electrochemical cell using the oxidation of fossil fuels or their derivatives by oxygen as the energy source. A fuel cell thus is a continuous-feed electrochemical cell in which energy from such a reaction is converted directly to electrical energy as long as fuel and oxygen are provided.

A fuel cell has an inherently high energy efficiency, as much as 85% in practice, as it converts chemical energy potential directly to electricity, avoiding the thermodynamic inefficiency of the Carnot cycle associated with heat engines. The practical difficulties of limited catalyst and electrode lives, the need for pure reactants, and engineering and fabrication difficulties and expense have all retarded development, installation, and use of fuel cells.

The most highly developed cells use a phosphoric acid electrolyte, a hydrogen-rich mixture of fuel gases obtained via the reforming action with steam, porous carbon or graphite electrodes and cell separators, with platinum group metal catalysts, operating at elevated temperatures (up to 200° C.) and pressures. The problems of confining a gaseous fuel and a corrosive electrolyte at such conditions, avoiding catalyst poisoning (principally due to sulfur compounds) and limited electrode life have prevented large-scale use of fuel cells to the present time.

Past efforts in the field have resulted in U.S. Pat. No. 3,867,206, Trocciola et al., disclosing a fuel cell having an electrolyte saturated matrix between electrodes sealing the gas by hydrophilic capillary action; U.S. Pat. No. 4,035,551, Grevstad, discloses a fuel cell having a porous electrolyte retaining matrix separating the electrodes with graduated pore sizes totally hydrophilic to the electrolyte; U.S. Pat. No. 4,115,528, Christner et al., discloses a method for fabricating porous carbon sheet material for fuel cell electrode substrates comprising coating carbon fibers with a mixture of furfuryl alcohol and a catalyst, with phosphoric acid the preferred catalyst, heating the mat to polymerize the furfuryl alcohol, and further heating at 1500° C. to carbonize the resin; U.S. Pat. No. 4,115,627, Christner, discloses a ribbed electrode substrate for an electrochemical cell having ribs of hydrophilic material on one side and optionally coated on the other side with a catalyst layer; U.S. Pat. No. 4,165,349, Sandelli, discloses a method for fabricating a porous ribbed electrochemical cell substrate comprising molding the substrate by loading a die with a dry mixture of thermosetting resin and carbon fibers, curing the mixture, then heating to 1100° C. to convert the resin to glassy carbon having a porosity of at least 75%; U.S. Pat. No. 4,233,369, Breault et al., discloses a cooler assembly for a stack of fuel cells comprising a fibrous, porous coolant tube holder sandwiched between and bonded to at least one of a pair of gas impervious graphite plates. Gas seals along the edges of the holder parallel to the channels are gas impervious graphite strips; U.S. Pat. No. 4,245,009, Guthrie, discloses a coolant tube holder for a stack of fuel cells, a gas porous sheet of fibrous material sandwiched between a cell electrode and a nonporous, gas impervious flat plate which separates adjacent cells. The porous holder has channels in one surface with coolant tubes. The gas impervious plate is bonded to the opposite surface of the holder, and the channel depth is the full thickness of the holder; U.S. Pat. Nos. 4,269,642 and 4,365,008, DeCasperis, disclose densified edge seals for fuel cell components comprising a porous electrode having a densified edge made from the same composition as the rest of the component by compressing an increased thickness of the material along the sides during the fabrication process, and a method for producing same; U.S. Pat. No. 4,422,894, Atkinson et al., discloses a flat gasket incorporating a metallic reinforcement layer formed by pressing uncompacted expanded graphite onto the opposed faces of the reinforcement simultaneously to form compacted graphite foils in situ while at the same time pressing some of the graphite particles relative to one edge to form a single unreinforced graphite foil portion extending from and integral with the other foils to enclose that one edge; U.S. Pat. No. 4,165,349, Sandelli, discloses a method for fabricating a porous electrochemical cell by loading a die with a dry mixture of thermosetting resin and carbon fibers, heating and curing up to 300° C. See also Enc. of Chem. Tech., Kirk-Othmer 3rd Ed., Vol. 3, pp. 545-568.

OBJECTS OF THE INVENTION

The object of this invention is to provide an effective wet edge seal porous graphitic electrode for phosphoric acid fuel cells, and other advanced devices where a gas seal is required to operate in a corrosive environment at extreme physical conditions.

SUMMARY OF THE INVENTION

The porous graphitic electrodes used in many fuel cells must be sealed on their edges to prevent gas losses through diffusion. One method of accomplishing this is to have the perimeter of the electrode nonporous or with low and small porosity. Many methods have been used such as adding extra layers of material to the edges, all of which have technical or economic costs which have helped retard the development of fuel cells. We have developed a new, economical and technically effective process to edge seal these graphitic electrode sections which provides a monolithic electrode with little or no porosity at the edges and a significantly higher porosity in the interior.

The edge seal itself is formed on a porous cellulose-based precursor material by pre-impregnating the edges only using a medium to high coke yield impregnant such as a phenol-formaldehyde condensation resin, coal tar, or coal tar pitch. The impregnated item may be cured at 150°-300° C. for 2 to 24 hours, then re-impregnated with a lower coke-yield impregnant on the total area of the electrode, or only on the interior, the electrode then being heated to cure the impregnant and carbonize the residue, in appropriate stages. The impregnation process may also be a double step, with the edges first impregnated, then the remaining area, and the complete baking, carbonizing and graphitizing process done continuously. In each case, the result is an electrode with a highly porous interior and a significantly less porous perimeter.

The process may also be accomplished by spraying the impregnant in two zones, one zone at the perimeter of the electrode precursor with a medium to high coke yield impregnant, the second zone at the interior of the electrode sprayed with a lower coke yield impregnant with the baking and carbonizing steps then carried out. The edges may be dipped to the correct depth desired, or the spray areas may be masked off to separate the zones. The steps may also be reversed and the edge or perimeter impregnation be the second stage with the first stage an impregnation of the total area of the electrode.

Other methods used to impregnate electrode precursors include coating the edges of raw, impregnated or cured plates by various other means including roller coating with liquid impregnants and powder coatings with fusible impregnants. If necessary, release paper may be used to separate the electrodes during baking.

After any of the coating procedures, the materials are carbonized by heating to peak temperatures of 500°–1100° C. over a period of 4 hours–4 days and may be additionally heat treated up to 1800°–3000° C. over an additional 4 hour–4 day period to graphitize the carbon residue.

The perimeter or edge portions of the electrodes thus produced are considerably denser and less porous than the functional portion of the electrode; e.g., the edges will normally have a pore volume less than 30%, while the functional portion of the electrode may have a pore volume of 70% or more.

By this method we produce monolithic edge-sealed graphite electrodes at low cost in a uniform consistent process with a controllable pore volume and density on both the edges and the functional areas of the electrode. The process is adaptable to continuous operation.

DETAILED DESCRIPTION OF THE INVENTION

Example 1.

A graphite electrode was made from 3.8 mm (0.150") cellulosic filter paper by impregnating the complete sheet for 2 minutes with creosote and impregnating on the edge only with coal tar, cured for 18 hours in an air atmosphere at 225° C., baked for 8 hours in an inert atmosphere on a cycle going to 620° C., and graphitized for 24 hours on a cycle rising to 2700° C. The resulting electrode base had a volume porosity of 66% at the center and 59% at the edge.

Example 2.

The same filter paper was impregnated with creosote, cured 18 hours in air at 225° C., then impregnated on the edge only with coal tar, cured 18 hours in air at 225° C., baked 8 hours on a cycle rising to 620° C., and graphitized in a 24 hour cycle rising to 2700° C. The resulting electrode base had porosities of 53% by volume at the center and 49% at the edge.

Example 3.

The same paper was impregnated with creosote, cured for 18 hours in air at 225° C., baked on an 8 hour cycle rising to 620° C., impregnated on the edge only with coal tar, cured 18 hours in air at 225° C., baked on an 8 hour cycle rising to 620° C., and graphitized on a 24 hour cycle rising to 2700° C. The resulting electrode base had volume porosities of 59% at the center and 46% at the edge.

In all of these three trials run on very small samples, the center porosities were lower than expected indicating significant wicking into the center from the edge. However, the center in these examples was only 1–2" removed from the edge.

Some further trials were undertaken with larger samples as follows, using the same base stock in the previous examples, a cure cycle of 18 hours in air at 225° C., an 8 hour bake cycle in nitrogen rising to 620° C., and a 24 hour graphitizing cycle in nitrogen rising to 2700° C. All of these samples were first impregnated with creosote as Step 1, then cured as Step 2, then baked at Step 3 and further treated as shown below in numbered steps.

We have found that the initial curing step should be an air or other oxidizing atmosphere which is a distinct departure from past practice, of carrying out the curing step in an inert atmosphere. The use of an air atmosphere provides improved porosity, higher yields of acceptable product with less breakage, and improved flatness, which is absolutely vital for both electrodes and separators.

Specifically we have found that air curing produces a higher pore volume, with the pores having a more favorable pore size distribution, than when the articles are cured in inert atmospheres.

The air cure slightly oxidizes the surface and gels the impregnant, consequently the articles are more rigid and do not crack, warp, or block as compared to cures in inert atmospheres.

TABLE I

| Sample | 1 | 2 | 3 | 4 | 5 | 6 | 7 | 8 | 9 | 10 |
|---|---|---|---|---|---|---|---|---|---|---|
| H37A | Impregnate Creosote | Cure | Bake | Edge Seal Coal Tar | Cure | Bake | Graphitize | | | |
| H37B | Impregnate Creosote | Cure | Bake | Edge Seal Coal Tar | Cure | Edge Seal Coal Tar | Cure | Bake | Graphitize | |
| H37C | Impregnate Creosote | Cure | Bake | Edge Seal Coal Tar | Cure | Bake | Edge Seal Coal Tar | Cure | Bake | Graphitize |
| H37D | Impregnate Creosote | Cure | Bake | Edge Seal Coal Tar | Cure | Bake | Edge Seal Phenolic Resin | Cure | Bake | Graphitize |
| H37E | Impregnate Creosote | Cure | Bake | Edge Seal Coal Tar | Cure | Edge Seal Phenolic Resin | Cure | Bake | Graphitize | |

TABLE I-continued

| Sample | Step 1 | 2 | 3 | 4 | 5 | 6 | 7 | 8 | 9 | 10 |
|---|---|---|---|---|---|---|---|---|---|---|
| H37F | Impregnate Creosote | Cure | Bake | Edge Seal Phenolic Resin | Cure | Bake | Graphitize | | | |

TABLE II

| SAMPLE | POROSITY Vol. % Center | POROSITY Vol. % Edge | THICKNESS Green | THICKNESS Graph. | A.D. |
|---|---|---|---|---|---|
| H37A | 81.4 | 38.9 | 3.76 mm | 2.18 mm | .735 g/cc |
| H37B | 71.1 | 22.3 | 3.76 mm | 2.34 mm | Not Available |
| H37C | 77.2 | 19.6 | 3.91 mm | 2.34 mm | .811 g/cc |
| H37D | 73.6 | 28.6 | 3.76 mm | 2.24 mm | .824 g/cc |
| H37E | 71.2 | 21.7 | 2.73 mm | 2.18 mm | .852 g/cc |
| H37F | 80.9 | 48.2 | 3.63 mm | 1.88 mm | .520 g/cc |

In the above examples, A.D. is the apparent density from weight and dimensions, and porosity is given in % by vol. as measured by the mercury porosimeter method near the edge and in the center. Thickness is shown in the initial and graphitized states in mm.

In the above examples, sample H-37-C represents the preferred embodiment of the invention.

Although only a cellulosic filter paper is shown as the base with creosote, phenol-formaldehyde resin and coal tar as the impregnants, other materials may be effectively used, such as synthetic fiber papers and felts and other fiber papers, and impregnants including other thermosetting condensation resins, and polymer solutions and melts of many types, the main requirement being a carbon residue on heating to coking temperatures. The electrode may be a glassy carbon but it is preferable to use the better physical and chemical properties of graphite. Thickness of the electrode base before impregnation may vary from approximately 0.5 to 5 mm, for use in different types of cells. A low coke yield impregnant is defined as having a coke yield of less than 50%, normally in the range of 5 to 30%, and a high coke yield impregnant is one having a coke yield of over 30% and normally in the area of approximately 40-70% or more, when heated under coking conditions as shown in the examples.

The cure and bake cycles will vary with the specific impregnant used as the phenolic resins are generally much faster curing than creosote or coal tar. In this context, curing is defined as the conversion of the impregnant from a liquid (at the cure temperature this will include resins and other impregnants which are solid at ambient temperatures) to a solid or semi-solid, normally for 2-24 hours at temperatures of from 150°-300° C. Baking is defined as the process of heating the item to a temperature high enough to coke the solid, driving off the bulk of the hydrogen and oxygen from the residue left from the cure cycle and leaving a higher purity carbon in the amorphous or glassy state as the major component. Graphitization normally occurs at temperatures over 1800° C., producing a pure elemental carbon residue in the hexagonal layered form as graphite. The resulting electrode will have an edge seal of about the specified width along the edge of the electrode.

We claim:

1. A process for the production of a porous monolithic graphite electrode for a fuel cell having an integral edge seal comprising the impregnation of a porous filter paper substrate having a thickness of from 0.5 to 5 mm with a low coke yield impregnant, curing said impregnated electrode from 2 to 24 hours in air at 150° C. to 300° C., baking said electrode in a 4 to 24 hour cycle rising to 500° C. to 1100° C., impregnating said electrode on the edges only with a medium to high coke yield impregnant, repeating said curing and baking steps, and graphitizing said electrode to 1800° C. to 3000° C. in a cycle of 4 hours to 4 days.

2. The process of claim 1 wherein creosote is the low coke yield impregnant and coal tar is the medium to high coke yield impregnant.

3. The process of claim 1 wherein the edge seal is approximately 1 cm wide.

4. The process of claim 1 wherein the edge is sealed with multiple impregnation steps.

5. A process for the production of a porous monolithic graphite electrode for a fuel cell having an integral edge seal comprising impregnation of a cellulosic filter paper having a thickness of from 0.5 to 5 mm with a low coke yield impregnant, curing said electrode for 2 to 24 hours at 150° C. to 300° C., impregnating said electrode on the edge only with a medium to high coke yield impregnant, repeating said curing step, baking said electrode for 4 to 24 hours in cycle rising to 500° C. to 1100° C., and graphitizing said electrode in a cycle of 4 hours to 4 days rising to a temperature of 1800° C. to 3000° C.

6. The process of claim 5 wherein the edge seal is approximately 1 cm wide.

7. The process of claim 5 wherein the edge is sealed with multiple impregnation steps.

8. A process for the production of a porous monolithic graphite electrode for a fuel cell having an integral edge seal comprising impregnating a cellulosic filter paper having a thickness of from 0.5 to 5 mm with a low coke yield impregnant, then impregnating the edges only with a medium to high coke yield impregnant, curing for 2 to 24 hours at 150° C. to 300° C., baking for 4 to 24 hours in a cycle rising to 500° C. to 1100° C., and graphitizing in 4 hours to 4 days on a cycle rising to 1800° C. to 3000° C.

9. The process of claim 8 wherein the edge seal is approximately 1 cm wide.

10. The process of claim 8 wherein the edge is sealed with multiple impregnation steps.

11. A process for the production of a porous monolithic graphite electrode for a fuel cell having an integral edge seal at the perimeter of said electrode comprising impregnating a cellulosic filter paper approximately 3.8 mm thick with creosote, curing said impregnated paper for 18 hours at 225° C., baking said impregnated paper for 6 hours in a cycle rising to 620° C., impregnating said impregnated paper on the edges with coal tar, repeating said curing and baking steps and graphitizing said impregnated paper on a cycle rising to 2700° C. over 24 hours.

12. The process of claim 11 wherein the edge seal is approximately 1 cm wide.

13. The process of claim 11 wherein the edge is sealed with multiple impregnation steps.

14. A process for the production of a porous monolithic graphite electrode for a fuel cell having a porosity by volume of less than 30% in a narrow band along the edges and a porosity of over 70% by volume in the balance of the area comprising impregnating a cellulosic filter paper having a thickness of approximately 3 to 5 mm with creosote, curing said electrode for 18 hours at 225° C., baking said electrode on a cycle rising to 620° C. over 8 hours, sealing the edges of said electrode in a narrow band along said edges with coal tar, repeating said cure, baking, and edge sealing steps, and graphitizing said electrode on a cycle rising to 2700° C. over 24 hours.

15. The process of claim 14 wherein the edge seal is approximately 1 cm wide.

* * * * *